United States Patent
Davis et al.

(10) Patent No.: US 9,609,117 B2
(45) Date of Patent: Mar. 28, 2017

(54) METHODS AND ARRANGEMENTS EMPLOYING SENSOR-EQUIPPED SMART PHONES

(71) Applicant: Digimarc Corporation, Beaverton, OR (US)

(72) Inventors: Bruce L. Davis, Lake Oswego, OR (US); Tony F. Rodriguez, Portland, OR (US); Geoffrey B. Rhoads, West Linn, OR (US); William Y. Conwell, Portland, OR (US); John Stach, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/861,758

(22) Filed: Sep. 22, 2015

(65) Prior Publication Data

US 2016/0028878 A1    Jan. 28, 2016

Related U.S. Application Data

(63) Continuation of application No. 12/982,470, filed on Dec. 30, 2010, now Pat. No. 9,143,603.
(Continued)

(51) Int. Cl.
*G10L 15/00* (2013.01)
*H04M 1/725* (2006.01)
(Continued)

(52) U.S. Cl.
CPC ........ *H04M 1/72569* (2013.01); *G06F 3/167* (2013.01); *G06F 17/30244* (2013.01);
(Continued)

(58) Field of Classification Search
CPC ............. G10L 2015/00; G10L 2015/22; G10L 2015/228; G10L 15/00; G10L 21/00
(Continued)

(56) References Cited

U.S. PATENT DOCUMENTS

| 6,199,044 B1 | 3/2001 | Ackley et al. |
| 6,243,713 B1 | 6/2001 | Nelson et al. |

(Continued)

FOREIGN PATENT DOCUMENTS

| WO | WO2011059761 | 5/2011 |
| WO | WO2011082332 | 7/2011 |
| WO | WO2011116309 | 9/2011 |

OTHER PUBLICATIONS

Srihari, Use of Multimedia Input in Automated Image Annotation and Content-Based Retrieval, Proc. of SPIE, vol. 2420, 1995, pp. 249-260.
(Continued)

*Primary Examiner* — Qi Han
(74) *Attorney, Agent, or Firm* — Digimarc Corporation

(57) ABSTRACT

The present technology concerns improvements to smart phones and related sensor-equipped systems. Some embodiments involve spoken clues, e.g., by which a user can assist a smart phone in identifying what portion of imagery captured by a smart phone camera should be processed, or identifying what type of image processing should be conducted. Some arrangements include the degradation of captured content information in accordance with privacy rules, which may be location-dependent, or based on the unusualness of the captured content, or responsive to later consultation of the stored content information by the user. A great variety of other features and arrangements are also detailed.

12 Claims, 5 Drawing Sheets

Related U.S. Application Data

(60) Provisional application No. 61/291,812, filed on Dec. 31, 2009.

(51) Int. Cl.

| | | |
|---|---|---|
| *G06Q 10/10* | (2012.01) | |
| *G06F 17/30* | (2006.01) | |
| *G06F 3/16* | (2006.01) | |
| *G06K 9/00* | (2006.01) | |
| *G10L 15/22* | (2006.01) | |
| *H04N 5/232* | (2006.01) | |
| *H04W 4/02* | (2009.01) | |
| *H04M 19/04* | (2006.01) | |

(52) U.S. Cl.
CPC ....... *G06K 9/00671* (2013.01); *G06Q 10/109* (2013.01); *G10L 15/22* (2013.01); *H04N 5/23203* (2013.01); *H04N 5/23293* (2013.01); *H04W 4/028* (2013.01); *G06F 2200/1636* (2013.01); *G10L 2015/223* (2013.01); *H04M 19/047* (2013.01); *H04M 2250/02* (2013.01); *H04M 2250/10* (2013.01); *H04M 2250/12* (2013.01); *H04M 2250/52* (2013.01); *H04M 2250/74* (2013.01)

(58) Field of Classification Search
USPC ...................................... 704/275, 270, 270.1
See application file for complete search history.

(56) References Cited

U.S. PATENT DOCUMENTS

| | | |
|---|---|---|
| 7,702,681 B2 | 4/2010 | Brewer et al. |
| 7,739,221 B2 | 6/2010 | Lawler et al. |
| 7,787,697 B2 | 8/2010 | Ritzau et al. |
| 7,792,678 B2 | 9/2010 | Hung |
| 7,890,386 B1 | 2/2011 | Reber |
| 8,487,867 B2 | 7/2013 | Wu et al. |
| 8,508,471 B2 | 8/2013 | Suh |
| 2002/0054067 A1 | 5/2002 | Ludtke et al. |
| 2002/0072982 A1 | 6/2002 | Barton |
| 2003/0117365 A1 | 6/2003 | Shteyn |
| 2003/0200089 A1 | 10/2003 | Nakagawa et al. |
| 2003/0231785 A1 | 12/2003 | Rhoads et al. |
| 2004/0212630 A1 | 10/2004 | Hobgood et al. |
| 2005/0036656 A1 | 2/2005 | Takahashi |
| 2005/0038814 A1 | 2/2005 | Iyengar et al. |
| 2005/0091604 A1 | 4/2005 | Davis |
| 2005/0096902 A1 | 5/2005 | Kondo et al. |
| 2005/0132420 A1 | 6/2005 | Howard et al. |
| 2005/0159955 A1 | 7/2005 | Oerder |
| 2005/0277872 A1 | 12/2005 | Colby et al. |
| 2005/0283379 A1 | 12/2005 | Reber |
| 2006/0047584 A1 | 3/2006 | Vaschillo et al. |
| 2006/0217199 A1 | 9/2006 | Adcox et al. |
| 2007/0200912 A1 | 8/2007 | Hung |
| 2007/0300267 A1 | 12/2007 | Griffin |
| 2008/0036869 A1 | 2/2008 | Gustafsson et al. |
| 2008/0071749 A1 | 3/2008 | Schloter |
| 2008/0267504 A1 | 10/2008 | Schloter et al. |
| 2008/0278481 A1 | 11/2008 | Aguera y Arcas |
| 2009/0031381 A1 | 1/2009 | Cohen et al. |
| 2009/0049100 A1 | 2/2009 | Wissner-Gross |
| 2009/0063279 A1 | 3/2009 | Ives |
| 2009/0110245 A1 | 4/2009 | Thorn |
| 2009/0122157 A1 | 5/2009 | Kuboyama et al. |
| 2009/0234773 A1 | 9/2009 | Hasson |
| 2009/0237546 A1 | 9/2009 | Bloebaum |
| 2009/0285492 A1 | 11/2009 | Ramanujapuram |
| 2009/0319388 A1 | 12/2009 | Yuan |
| 2010/0046842 A1 | 2/2010 | Conwell |
| 2010/0070501 A1 | 3/2010 | Walsh |
| 2010/0241946 A1 | 9/2010 | Ofek |
| 2010/0312547 A1 | 12/2010 | Van Os et al. |
| 2011/0035406 A1 | 2/2011 | Petrou |
| 2011/0038512 A1 | 2/2011 | Petrou |
| 2011/0085739 A1 | 4/2011 | Zhang |
| 2011/0125735 A1 | 5/2011 | Petrou |
| 2011/0128288 A1 | 6/2011 | Petrou |
| 2011/0131235 A1 | 6/2011 | Petrou |
| 2011/0131241 A1 | 6/2011 | Petrou |
| 2011/0135207 A1 | 6/2011 | Flynn |
| 2011/0138286 A1 | 6/2011 | Kaptelinin |
| 2011/0157184 A1 | 6/2011 | Niehsen |
| 2011/0158558 A1 | 6/2011 | Zhao |
| 2011/0167053 A1 | 7/2011 | Lawler |
| 2011/0196859 A1 | 8/2011 | Mei |
| 2011/0289098 A1 | 11/2011 | Oztaskent |
| 2012/0102066 A1 | 4/2012 | Eronen et al. |

OTHER PUBLICATIONS

U.S. Appl. No. 61/277,179 by Kaptelinin, filed Sep. 22, 2009.

U.S. Appl. No. 61/73,673 by Kaptelinin, filed Aug. 7, 2009.

Absar et al, Usability of Non-Speech Sounds in User Interfaces, Prof. of 14th Int'l Conf. on Auditory Display, Jun. 2008.

Anciaux, Data Degradation—Making Private Data Less Sensitive Over Time, Proceeding of the 17th ACM conference on Information and knowledge management, 2008, 3pp.

Anciaux, InstantDB—Enforcing Timely Degradation of Sensitive Data, 2008 IEEE 24th International Conference on Data Engineering, 3pp.

Blanchette, Data retention and the panoptic society—the social benefits of forgetfulness, The information Society, vol. 18, No. 1, 2002.

de Inpina, Interacting with our Environment through Sentient Mobile Phones, Proc. of 2d Int'l Workshop in Ubiquitous Computing, pp. 19-28, 2005.

Erol et al, Mobile Media Search, IEEE ICASSP, Apr. 2009. Hong, An Architecture for Privacy-Sensitive Ubiquitous Computing, UC Berkeley PhD Thesis, 2005.

Huang, et al, Kimono—Kiosk-Mobile Phone Knowledge Sharing System, Proc. 2d Int'l Workshop in Ubiquitous Computing, 2005.

Kieffer et al, Oral Messages Improve Visual Search, Proc. Of the ACM Conf. on Advanced Visual Interfaces, 2006.

Mayer-Schonberger, Useful Void—The Art of Forgetting in the Age of Ubiquitous Computing, Harvard Faculty Research Working Paper Series RWP07-022, 2007, 26pp.

Papakonstantinou, et al, Framework for Context-Aware Smartphone Applications, Visual Computing, vol. 25, Aug. 2009, pp. 1121-1132.

Santangelo, A Chat-Bot based Multimodal Virtual Guide for Cultural Heritage Tours, Proc. of the 2006 Int'l Conf on Pervasive Systems and Computing, pp. 114-120.

van Heerde, A framework to balance privacy and data usability using data degradation, 2009 Int'l Conf on Computational Science and Eng'g, 8 pp.

van Heerde, Privacy-aware data management by means of data degradation, PhD thesis, May 2010.

Weiser, The Computer for the 21st Century, Scientific American, 1991.

First Action in Chinese Application 201080065015.6 (corresponding to PCT WO2011082332), Nov. 2013.

Response to First Action in Chinese Application 201080065015.6 (corresponding to PCT WO2011082332), Apr. 2014.

Second Action in Chinese Application 201080065015.6 (corresponding to PCT WO2011082332), Jul. 2014.

Response to Second Action in Chinese Application 201080065015.6 (corresponding to PCT WO2011082332), Oct. 2014.

International Preliminary Report on Patentability, PCT/US2010/054544 (published as WO 2011/059761), May 1, 2012.

International Preliminary Report on Patentability, PCT/US2011/029038 (published as WO 2011/116309), Sep. 25, 2012.

International Search Report, PCT/US2010/054544 (published as WO 2011/059761), Feb. 28, 2011.

International Search Report, PCT/US2011/029038 (published as WO 2011/116309), Jul. 19, 2011.

(56) References Cited

OTHER PUBLICATIONS

U.S. Appl. No. 61/273,673 by Kaptelinin, filed Aug. 7, 2009 (priority case for US20110138286).
U.S. Appl. 61/277,179 by Kaptelinin, filed Sep. 22, 2009 (priority case for US20110138286).
Prosecution excerpts from European patent Application 11757077.0, including amended claims filed May 3, 2013, Extended European Search Report dated Jul. 25, 2013, and Response filed with EPO on Feb. 20, 2014.
Yang et al, Smart Sight—A Tourist Assistant System, 3d Int'l Symposium on Wearable Computers, 1999, pp. 73-78.
Xie et al, Mobile Search with Multimodal Queries, Proc. of the IEEE, vol. 96, No. 4, Apr. 2008, pp. 589-601.
Prosecution excerpts from U.S. Appl. 12/797,503, filed Jun. 9, 2010, including PTO Actions mailed Dec. 19, 2012, Aug. 13, 2013, Apr. 8, 2014, and Oct. 28, 2014, and Applicant responses filed Apr. 17, 2013, Nov. 21, 2013, Dec. 10, 2013, Jul. 8, 2014, Dec. 29, 2014 and Apr. 24, 2015.

METHODS AND ARRANGEMENTS EMPLOYING SENSOR-EQUIPPED SMART PHONES

RELATED APPLICATION DATA

This application is a continuation of application Ser. No. 12/982,470, filed Dec. 30, 2010 (now U.S. Pat. No. 9,143,603), which claims priority benefit to provisional application 61/291,812, filed Dec. 31, 2009.

FIELD OF TECHNOLOGY

The present application concerns improvements to smart phones and related systems.

INTRODUCTION

Application Ser. No. 12/640,386 (filed Dec. 17, 2009, published as 20110098029), describes a variety of technologies suitable for use with sensor-equipped smart phones.

Application Ser. No. 12/271,772, filed Nov. 14, 2008 (published as 20100119208), and application Ser. No. 12/490,980, filed Jun. 24, 2009 (published as 20100205628), disclose various manners in which smart phone-like devices can interact with ambient media.

The present document extends the work of these prior patent applications, e.g., detailing additional applications to which such technology can be put.

In accordance with certain aspects of the present technology, a smart phone provides helpful guidance to a commuter on her way to work.

In accordance with other aspects of the present technology, a smart phone is aided in various intuitive computing operations by user-provided (e.g., spoken) clues.

The foregoing and additional aspects, features and advantages of the present technology will be more readily apparent from the following detailed description, which proceeds with reference to the accompanying drawings.

DETAILED DESCRIPTION

Bike Commuting

Figure 1:
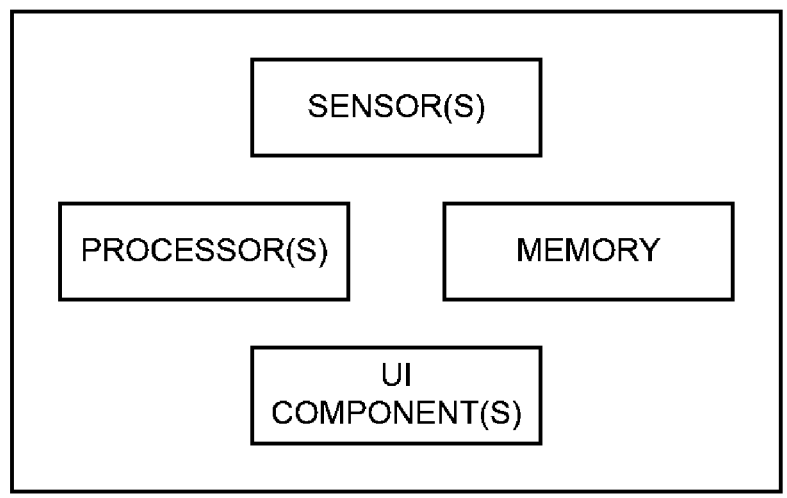
FIGS. 1-9 show aspects of certain of the arrangements detailed herein.

Elizabeth wants to commute by bike/train as much as possible for her health, and to reduce her carbon footprint. On a good day, her commute takes an hour, but if she doesn't make two train connections exactly, she must either ride in hazardous traffic, or wait in the cold for up to 30 minutes for the next train (and be late for work).

Previously, Elizabeth had to do lots of manual planning. When the alarm went off at 6:30 a.m., she checked the latest weather forecast. If heavy rain was predicted, she generally left her bicycle at home and drove instead—giving her an extra 30 minutes to kill around the house. (Actually, she'd rather have slept, but once the alarm wakes her—that's it.) She also checked her electronic calendar. If there is an early meeting (before her usual arrival time of 8:00 am), she'd have to hurry and catch an earlier train.

The trains introduce lots of variability. Elizabeth has to catch one, and then connect with another. Their published schedules make it look straightforward, but it rarely is. A few minutes can be added to the ride depending on weather, traffic conditions and street light sequencing. Nominally, she catches the first train at 7:08 am, which delivers her to the connection point at 7:22. The second train departs the connection point at 7:28, and arrives at a station a few miles from her work at 7:37. However, the second train runs only every 30 minutes, so if she misses it, her bike commute is lengthened five miles through some bike-unfriendly roads. (Or she can wait in the cold for the next train.)

Some days she misses the second train because the first train is a few minutes late arriving. Other days she misses it because she is a moment late biking to the first station—missing the first train (the next train on that route—they depart every eight minutes—doesn't make the connection even if on time).

When Elizabeth needs to be at work early (even five minutes early), she needs to leave home about 30 minutes earlier in order to catch the 30 minute-earlier second train.

The transit agency has a good web site with real time schedule advisories, but using the iPhone while riding bike is only for the suicidally inclined. Waiting at a stoplight, Elizabeth could pull out her phone, but even this is just not practical. She needs real-time feedback as to her pace and whether she will make her target destination on time, or whether she needs to change her route to meet the first train at an earlier stop.

After checking all the available information at home and setting her plans, Elizabeth gets on her bike and heads off for the first station—hoping for the best, but always a bit worried that something will intervene to disrupt her plans. So she rides faster than she probably should, just to be sure she can make her connection.

Some days, Elizabeth arrives at work on time, merely stressed. Other days it's worse.

In accordance with one aspect of the present technology, Elizabeth's commute is eased. For example, a smart phone gives Elizabeth advice telling her where and when to go to make various connections, updated in real time, without Elizabeth having to touch or look at the device.

The improvements start at home. Elizabeth sets the smart phone's nominal alarm time to 6:00, but the phone may adjust this based on circumstances, and/or on observations of Elizabeth's behavior.

One circumstance is a morning meeting that requires Elizabeth to be at work before 8:00 a.m. The phone checks Elizabeth's calendar for the day ahead, and if it finds a meeting that starts between 7:30 and 7:59, the phone revises the alarm time to wake Elizabeth 30 minutes earlier. If the meeting starts between 7:00 and 7:29 (Elizabeth dreads the conference calls with the Amsterdam office), the alarm time is adjusted a further 30 minutes earlier, i.e. to 5:00 a.m.

Another circumstance is weather. A web site (e.g., Yahoo! Weather) publishes hourly updates to a forecast for peak wind speeds and rainfall for the remainder of the day ahead (as well as publishing current conditions). The phone checks the web site shortly before sounding the alarm, to determine if (1) the day's peak gusts are forecast to be above 20 mph, or (2) the day's rainfall is forecast to exceed 0.2 inches. Elizabeth has earlier specified these parameters as characterizing days she'd rather drive her car. If either is true, the phone delays the alarm time 30 minutes—allowing Elizabeth a precious half-hour of extra sleep. (The phone allows an essentially limitless number of weather and other criteria, either individually or in combination, to be defined—each with a corresponding change to the alarm time, forwards or backwards. So the phone essentially decides whether it's a good day to ride or not, and alters the alarm time accordingly.)

Elizabeth has granted the phone autonomy to make these appointment- and weather-based changes to alarm time on its own. The phone may also suggest other adjustments to the alarm time, which Elizabeth can accept or not.

For example, by sensing Elizabeth's past behavior, the phone may recall that on Fridays, Elizabeth often stops for a few minutes on her way to the first train (she buys a coffee treat to mark the end of the week). However, she then has to cycle extra-hard to get to the first train station on time. The days she misses the first train are often Fridays.

The phone can sense this pattern of behavior. By sensors such as a temperature sensor (e.g., a thermistor), motion sensors (e.g., 3D accelerometers), direction sensors (e.g., 3D Hall effect devices) and a location sensor (e.g., GPS), the phone notices, and logs, different patterns of sensor data as a function of day and time. The extended pause on Elizabeth's Friday commute, between home and the first train station, is evident both from the GPS sensor, and from the motion sensors.

Recognizing her Friday extra-hard bicycling motion on the second leg of her trip to the train station, and recognizing that GPS data shows her sometimes catching a later first train, and missing her normal second train, and arriving at work late, the phone may suggest to Elizabeth that the alarm for Friday mornings should ring at 5:55 a.m. instead of 6:00. Elizabeth thinks this is prudent, and accepts the recommendation. She now rarely misses the first train, yet still enjoys her Friday treat.

While Elizabeth rides towards the first train station, her smart phone checks the transit agency's data feed of real-time location information for the trains. If her usual first train is running more than two minutes late (threatening a missed-connection with the second train), the phone signals Elizabeth to divert to an earlier train stop, to catch an earlier train. (Elizabeth usually catches the first train at Goose Hollow—this gives her an invigorating thirty minute ride. But she cycles near other train stops where she could catch earlier trains, at the expense of a shorter, less-interesting, bike ride.)

The phone can signal to Elizabeth in various ways. Since she carries the phone in a pocket, the vibration mode works well. If no adjustment to the normal commute is needed, the phone gives a reassuring little buzz every minute or so. However, if Elizabeth needs to divert to catch an earlier train, the phone gives a series of four long, strong, vibrations to signal same (at least until Elizabeth taps the phone twice through her clothing—indicating acknowledgement of the phone's signal). Other riders carry their phones in a backpack or bike bag, and elect—by stored preference data—an auditory signal (e.g., tones, or verbal), such as through the phone speaker.

Normally the drawbridge on Elizabeth's commute is down during rush hour. Sometimes, however, it rises—disrupting the normal traffic flow, and delaying Elizabeth. The phone, naturally, senses an unusual pause in Elizabeth's motion and GPS-progress. It recalls prior pauses near this location (and perhaps around this time-of-day) in Elizabeth's stored history profile, and notes that she sometimes waits six minutes before proceeding. Preparing for the worst, the phone extrapolates Elizabeth's predicted time of arrival at the normal Goose Hollow train station (using historical transit time information between that point and the train station). If it finds that she'll miss the train needed to make her connection, the phone can again signal Elizabeth to divert to an earlier train station, to make up for lost time.

Elizabeth knows her way around town well, but other users don't. The phone has a navigation option that can be triggered by tapping the phone three times, causing it to direct the user to the current destination (e.g., the earlier train station). In its vibratory mode the phone gives two strong vibrations to signal a right turn at the upcoming intersection, and three strong vibrations to signal a left turn. While proceeding on the correct route, the phone periodically offers a comforting buzz to confirm that everything is OK. (Some implementations may utilize plural vibratory components—e.g., one worn on each wrist, which components communicate wirelessly to other system elements. In such implementation, the device on the left wrist can vibrate to signal a left turn, and both devices can buzz periodically to signal continued travel in the current direction. Other users may elect voice navigation prompts.)

On the first Friday of the month, a local civic organization offers free coffee and pastries to cyclists in the city park. Normally Elizabeth rides by the freebies, lest she miss her connection. But the smart phone can help here, too. She taps the clothing over her smart phone four times. The corresponding motion sensor data is interpreted by the phone processor as a request for information about Elizabeth's progress along her route. The phone checks Elizabeth's current location (by GPS), and forecasts when she'll arrive at her destination (the train station). This calculation is primarily based on stored historical transit times from the current location to the train station (together with knowledge of the present time). Transit times for the current day of the week, and/or around the current time of day, may be especially relevant; other data may be disregarded, or given less weight in the calculation. The expected time of arrival calculation can also be influenced by other factors. For example, if the earlier part of Elizabeth's ride was 10% slower than normal, then a similar factor may be applied in estimating the length of the remaining part of the ride.

The phone also checks the latest real-time data from the transit agency, indicating the time at which Elizabeth's intended train will be at the train station. The phone then computes how early Elizabeth is forecast to arrive. It communicates this information to Elizabeth in vibratory fashion, by one long vibration, followed by a number of short vibrations—one for each minute that Elizabeth is forecast to arrive early. On this day the phone indicates Elizabeth is expected to arrive at the train station with five minutes to spare, so she pulls off in the park for a scone.

In circumstances earlier detailed, the phone foresaw a significant risk that Elizabeth would miss her train connection, and accordingly suggested an alternate course of action. In other cases, where Elizabeth needs simply to pick up her pace a bit to make a safe connection, the phone can indicate same by another form of feedback, e.g., a gently nagging buzz.

The phone checked the weather forecast before Elizabeth woke. But it can also check online resources to learn current conditions during Elizabeth's ride. It may discover, for example, that Elizabeth is cycling into a 15- or 20 mph east headwind. It may further sense that she is laboring hard. (A variety of sensors can be employed in such assessment, e.g., a biometric sensor, such as heart rate monitor, and/or instrumentation on the bike, such as a sensor that tracks Elizabeth's pedal cadence.) Based on such factors, the device may suggest that Elizabeth divert to a closer train station, or to a destination that changes her direction of travel so that the wind is across her path instead of a headwind.

Sometimes Elizabeth may make a decision to vary from her usual route, and may signal the phone accordingly. Her series of taps may indicate a particular alternate destination (e.g., a nearer or more distant train station). The phone can then base its further operation on this alternate destination.

The phone came pre-programmed with a default grammar of taps and vibrations by which the user signals to the phone, and vice versa. However, Elizabeth preferred to define her own. For this purpose the phone provided a software routine allowing Elizabeth to tailor the input and output signals. In this personalized vocabulary Elizabeth defined different signals to represent different train stations, etc.

Because the phone has a 3D accelerometer, its output signals allow the processor to distinguish taps at different locations on the phone's body. For example, a tap at the center of the front (or back), jars the phone primarily along one axis. A tap towards one end additionally causes a slight rotary movement around another axis. A tap towards the opposite end causes an opposite movement around that axis. A tap towards one side causes a slight rotary movement around another axis, etc.

While Elizabeth is riding her bike, she cannot reliably locate taps at particular locations on the phone body. However, the phone can distinguish multiple taps with a single finger, from a like number of taps from a sequence of different fingers. The former strikes the phone at a fixed location, whereas the latter consists of a series of strikes at different locations (like playing a series of notes in a piano scale). Thus, in defining her personal grammar, Elizabeth assigns a sequence of two taps in one location to one meaning, and a sequence of two taps in different locations to another meaning. Likewise for three taps, and four taps.

The device can also distinguish input messages based on different density of the contact such as tapping vs. knuckle knocking. Full force knocking may be used to signal more urgent messages (e.g., "I'm detouring to another destination now"), while lighter force tapping may be used for other messages.

The tap vocabulary can include pauses as well as taps. A sequence consisting of two taps, a pause, and a further tap, can mean one thing; a sequence consisting of one tap, a pause, and two further taps, can signal something else.

The speed of the taps can also be used to form distinct signals. Three taps in the span of one second can mean one thing; three taps in the span of three seconds can signal something else.

Combinations of the foregoing can also be employed.

Elizabeth has configured the phone to speak the current time, and the time of her next train connection, when she issues a quick tap, tap, pause, tap signal. (The phone uses known text-to-speech software to voice the current time, and the real-time data from the transit agency.) Other patterns of taps cause the phone to voice the weather forecast, or other information. (Alternatively, same can be triggered by Elizabeth's voice commands.)

The patterns of vibrations issued by the phone, and their corresponding meanings, can be defined similarly.

The above-described functionality can be provided through an application program launched by Elizabeth before she leaves the house. Or the phone may activate such functionality on its own, based on contextual clues (e.g., day of week, time of day, location, motion, etc.).

The technologies just-detailed can be employed in conjunction with sensors, UIs and other technologies associated with MIT's "Copenhagen Wheel," providing still further advantages to the bike commuter. (See, e.g., Chandler, MIT's Big Wheel in Copenhagen, MIT News Office, Dec. 16, 2009).

User-Provided Clues

The earlier-cited patent documents disclose various intuitive computing operations that can be performed by smart phone-based systems. For example, a phone may visually sense features in the user's environment, and automatically undertake certain actions in response.

As noted in the cited documents, one of the challenges in intuitive computing is identifying what of the sensed data to focus effort on, and what to ignore. In accordance with another aspect of the present technology, the user aids the system in this process.

Consider a user at a party. The user's phone images a scene cluttered with objects and people. The user can quickly help the phone to focus its processing attention appropriately by saying "Look at Tony."

Speech to text conversion is readily accomplished by the phone. (Dragon Dictation, by Nuance Communications, Inc., is one of several apps for the iPhone that performs such operation.) The smart phone can apply a parser to the converted text, and recognize "look at" as a command directing the phone to focus its visual processing on an identified subject.

The phone doesn't find a "Tony" command in its stored list of directives, so consults a further stored data structure that serves as a vocabulary database. From the vocabulary database the phone finds that Tony is a person (rather than, e.g., a place or thing, or a member of some other taxonomical classification), and finds various other information (or links to other information) relating to Tony. This information can include facial eigenvectors by which Tony's face can be recognized. The smart phone processes the captured image data, looking for a face corresponding to the stored eigenvector data. Once "Tony" is identified, the phone can take whatever further action is directed by the user, or is otherwise indicated. (E.g., the phone may adjust the camera's optics to focus and/or zoom on Tony; it may segment Tony from the rest of the frame—blurring or cropping-out portions of the image that are not Tony, etc.)

If the phone can't make sense of the word "Tony" (or if the utterance is mis-recognized, causing the vocabulary look-up to fail), it can indicate same to the user by an appropriate output signal. The user can respond with further help if desired, e.g., by saying "green shirt." The phone's available vocabulary may not have an entry for "shirt," but it has a color glossary with an entry for "green." Associated data indicates that green is a color having a specified range of gamuts in the RGB color space. The phone can then analyze the captured image scene, looking for a contiguous grouping of pixels having values within the specified range. As before, the phone can concentrate its processing resources on this region, and take whatever action is appropriate in the circumstances. (The phone may simply ignore the unrecognized term "shirt" since it is able to take a user-responsive action based on "green" alone.)

In like fashion the user may clue the phone with directions such as "the square one," "the moving one," "the bright one," and other such clues that can aid the phone in identifying an intended region of interest.

Sometimes the phone may focus its visual attention on a subject different than what the user desires. For example, the phone may be following a set of stored intuitive computing rules specifying that in a frame having a person, an object, and a background, the intended subject is likely the person (next followed by the object, next followed by the background). The phone may indicate this understanding by drawing a bounding rectangle around the subject it is concentrating on—the person—on the phone's output display. The user may, however, want the phone to direct its operation not to the person but to the object. This may be effected by a user-spoken command as simple as "not." The phone recognizes this term as an indication that its current subject of attention is not the desired one. The phone can respond to this command by consulting the stored set of rules to identify a "next" subject in the stored-rule hierarchy: the object. It can indicate same by moving the bounding rectangle to the object depicted on the display. Without further command from the user, the phone then directs is processing efforts to the object. (The same result may be achieved by the spoken command "Not the person" or "Not Tony.") Saying "not" a second time causes the phone's attention to switch to the image background.

Some scenes may depict several objects. To which should the phone direct its attention? One approach is to focus attention on the object closest to the center of the image frame. Another is to focus attention on the largest object. (Other criteria on which to base such decision are detailed in U.S. Pat. No. 7,628,320.) But, again, these rule-based approaches may not coincide with the user's desire. The user may direct the phone to move the focus of its attention by commands such as "left," "right," "up," "down," "the middle one," and other such directions.

Thus, spoken speech can be used in a variety of ways, such as directing the phone's attention to, or away from, or between, different features in the image—bounding the phone's processing burden to a constrained excerpt of the visual information.

The commands spoken by the user needn't be words, per se. A user-specific vocabulary can be defined that allows grunts, guttural utterances, and the like, to trigger responsive actions—even if such sounds are not part of any standard dictionary. Thus, in the example just-detailed, instead of "not," the user may mumble "unh-h" with the same effect. Existing speech-to-text programs, such as Dragon, may be configured to translate such verbal shortcuts into specified text output (e.g., "unh-h"="not"). Or pattern matching may be employed to identify which of several previously-stored utterances a given sound most closely matches. These previously-stored utterances can be associated with their standard-dictionary meanings. In still other arrangements, the phone can simply observe repeated user behavior, such as a pattern of saying "unh-h, not," until it associates these two utterances as synonyms.

Spoken words can serve not simply to help the phone identify a subject of interest in a scene, but also to provide information about a subject—again to aid the phone in further processing. (All such verbal assists may also help the phone "learn"—reducing the phone's need for such assists when the same visual stimulus is presented in similar circumstance/context later.)

Consider a user who points a phone camera at a red enamel earring, shaped like a leaf, in a jeweler's display case. The phone may, on its own, correctly identify the portion of the image frame with the earring as the area of interest (and might draw a bounding box around that region). But the shape could be any number of things: a leaf, an earring shaped like a leaf, a detail of wallpaper depicting a leaf, a portion of a Canadian flag, a tattoo, etc., etc. To help the phone make sense of what is depicted, the user may say "earring." With this information, the phone may undertake actions appropriate to that particular subject (e.g., search image catalogs published by online jewelers, looking for similar earrings, and then provide information about price, availability, artist, etc., back to the user). If, in contrast, the user had said "flag," the phone would have undertaken different actions, and provided one or more different responses back to the user.

Sometimes the verbal clue doesn't help the phone make sense of what is depicted, but rather suggests the type of response desired by a user. Consider a car buff that captures an image of a Ford Shelby in a parking lot. She may utter the phrase "Ford" or "Shelby" to help the phone identify the car from the universe of possible automobile types. But she may also, or additionally, give verbal instructions, or clues, about what type of response is desired. "Magazine" may prompt the phone to provide listings of, or links to, magazine articles about the Ford Shelby. "Displacement" may prompt the phone to undertake a search in which "displacement" appears with "Shelby." After conducting such a search (e.g., using Google), the phone may display technical statistics for the car, including that its engine has a 5.4 L displacement. "Price" may prompt the phone to obtain pricing for the Ford Shelby. "EBay" may prompt the phone to identify EBay listings relating to Ford Shelbys. "Owner" may prompt the phone to try and identify an owner of this particular Shelby, e.g., by OCRing the characters on the vehicle license plate, and accessing a Department of Motor Vehicles registry to look-up the owner. If the phone action isn't in accord with the user's desire, the user can direct, and further-direct the phone as necessary. Likewise, the user can drill down through the result data output by the phone, to obtain more detailed (or different) data.

By such arrangements, the user can iteratively focus the phone's attention as desired—in some instances emulating conversation, with the user directing, the phone responding, the user further-directing, etc.

Related improvements can be made to interaction with augmented reality (AR) applications (e.g., UrbanSpoon, Layar, Bionic Eye, Wikitude, Tonchidot, etc.), which superimpose geographically-registered dots or icons on local scenes, e.g., identifying restaurants and other attractions, often with text captions. The user is supposed to tap the dot/icon (or text caption) corresponding to the feature of interest, to learn more. But "touch" is a clumsy input mechanism on a crowded screen. Better to take spoken direction from the user. So if an AR app indicates that the captured street scene ahead of the user includes an A+ ranked Chinese restaurant named Won Foo, a Starbucks, a McDonalds, and a C train subway station, rather than touching the screen, the user may simply say "Won Foo." Although this phrase may not be in the stored vocabulary, the phone software compares the text-converted spoken input with the words shown as text captions by the AR app. Finding a match, the phone then sends a message to the AR app that serves as a proxy for a user tap on the Won Foo icon (or caption). The phone then provides a corresponding response, such as presenting the menu for Won Foo on the phone screen.

In processing a stream of captured imagery (e.g., video), audio prompts can be used demark the beginning and end of relevant excerpts. For example, the phone may recognize the words "start" and "end" to define a session of video to which the phone is to particularly direct its processing. (As in the still image example noted earlier, it can be helpful to clue the phone not just about what content to process, but also about what content *not* to process.)

While the foregoing has focused on aiding visual processing (e.g., object segmentation and recognition) with audio clues, the reverse is also possible, e.g., aiding audio processing with visual clues. Also, audio processing may be aided by user-provided audio clues, and visual processing may be aided by user-orchestrated visual clues.

For example, the user command "Listen to the speech" can direct the phone to focus its audio processing on speech in the captured audio, and not other sounds (e.g., music). "Listen to the TV" can direct the phone to focus its audio processing on sounds characteristic of TV audio. More specifically, the device may sample the audio in a manner calculated to serve possible future uses. For example, stored data in the phone may indicate that TV audio may be processed to extract a Nielsen watermark, encoded at known spectral locations in the 2-5 KHz range, or processed to extract a Shazam fingerprint, which may be characterized by energy in a particular range of frequencies. Filtering and sampling rates can thus be varied in accordance with the type of audio to which the user directs the phone's attention.

Privacy

Privacy will become increasingly important as smart phones collect more information from the user's environment. The same problem arises in "life-logging"—the archival collection of information about a user's life and travels. This field includes social networking arrangements such as Facebook and Twitter, and also the more complex data collection arrangements pioneered by Gordon Bell and Steve Mann.

(Gordon Bell at Microsoft has compiled a digital archive of his recent existence through his technologies CyberAll, SenseCam and MyLifeBits. Included in Bell's archive are recordings of all telephone calls, video of daily life, captures of all TV and radio consumed, archive of all web pages visited, map data of all places visited, polysomnograms for his sleep apnea, etc., etc., etc. (For further information see, e.g., at Bell, A Digital Life, Scientific American, March, 2007; Gemmell, MyLifeBits: A Personal Database for Everything, Microsoft Research Technical Report MSR-TR-2006-23; Gemmell, Passive Capture and Ensuing Issues for a Personal Lifetime Store, Proceedings of The First ACM Workshop on Continuous Archival and Retrieval of Personal Experiences (CARPE '04), pp. 48-55; Wilkinson, Remember This, The New Yorker, May 27, 2007. See also the other references cited at Gordon's Bell's Microsoft Research web page, and the ACM Special Interest Group web page for CARPE (Capture, Archival & Retrieval of Personal Experiences).)

Regarding privacy, consider a user visiting an electronics retailer—capturing images of products of potential interest for later research and possible purchase. The imagery may also include faces of other visitors to the store. The phone may also pick up a conversation of a nearby couple privately deliberating about a birthday gift for their daughter.

A few weeks later, the user may wish to recall this information e.g., to undertake some further research on the depicted products, or to find his way back to the correct aisle in the store to pick up an item for purchase.

The user may access the historical archive of information relating to his previous visit by recalling the date, and searching the archive that way. But that's tedious. Easier may be to use a map-based user interface, and tap the retailer's approximate location on the map. The device can then search the geotagged user history (which may be stored locally or in the cloud) for experiences within a quarter- or tenth-mile of that location, and present the user with metadata about each on the screen. The user recognizes the earlier visit to the store by the date metadata (it was a few weeks ago—not months or years ago as the other geolocated data) and interacts with the UI to recall the stored information.

In accordance with this aspect of the present technology, the full video and audio captured by the user in the store weeks ago is no longer available. Instead, it has been processed in the interim (locally and/or in the cloud) to extract certain information. For example, the user's path through the store is identified by geocoordinates, and the duration of his pauses at different shelf locations are indicated. The various directions in which the user faced at different times and geolocations, as indicated by magnetometer data, can also be recalled. Payloads of barcodes and watermarks sensed in the captured imagery are stored, as are sensed RFID (Near Field Communication) identifiers, with the respective geocoordinates at which each was encountered. If the user verbally annotated his visit with some spoken observations, and speaker-recognition technology allowed the phone to identify the speaker as the phone's owner, then these recorded annotations may have been transcribed to text and stored for recall (or, with user permission, the full audio may be retained for review). But audio not corresponding to the user (or other known persons, such as social network acquaintances) is not retained. Nor is the original imagery.

The information extracted from an object may serve as a digest, or hash, of the originally-captured information. For example, it may serve as an essentially unique identifier of the object in the originally-captured data, but not permit the originally-captured data to be re-generated from the digest (i.e., it serves as a one-way function). Known image and audio fingerprint functions, watermark decoding, and other data extraction arrangements can be employed for this purpose. So can SIFT data and KeyVector data, as detailed in patent application Ser. No. 12/640,386. (All such operations are regarded as fingerprint functions herein.)

In some arrangements, the data detail decays over time. The day or week that the information is collected, it may be retained in its original, unabridged form. In a next interval of time (e.g., the following week), faces may be blurred and audio not corresponding to the user may be distorted. In a further interval of time, further anonymization actions may be taken, such as deleting the imagery and retaining only the digested information. Some of the digested information may also degrade after further periods of time have passed. Etc.

The described privacy arrangement may be the default configuration for the phone, but the user may be allowed to vary it. For example, the user may instruct the phone to identify all candidate faces in the captured imagery, and try to recognize same by reference to facial parameters, e.g., stored in association with the user's Picasa or Facebook account. In some arrangements, the phone is allowed to perform such facial recognition only with the permission of the person being recognized (which may be signaled from that person by Bluetooth, RFID or other wireless technology, and verified as originating from that person using locally-unique identification information conveyed by the signal, such as by an incomplete set of facial parameters).

Applicable rules can also set different lifetimes for different data, e.g., retaining RFID-sensed information for two years (or forever), while gradually degrading—and then discarding—captured imagery over a period of twelve months.

The privacy procedures applied by the system can be contextually dependent. For example, if the user is at home or in the user's car, the phone may automatically apply a different set of privacy policies than if the user is at the electronics retailer, etc.

Frequency of visiting different locations can also factor into the degradation policy. If a location is visited infrequently, e.g., the Grand Canyon, applicable rules may dictate a lengthier retention period than if a site is visited routinely, e.g., the neighborhood grocery store. (In certain contexts, contrary rules might be appropriate.)

The foregoing is an example of a more general rule that, the more unusual the captured content seems to be, the longer it should be maintained. (Or, stated the other way, the more commonplace the captured content, the shorter should be its retention lifetime.) Heuristics or artificial intelligence techniques can be applied to generate an estimate of such content salience.

It will be recognized that such a salience-based approach is also user-specific. Content captured in Paris will be retained longer if captured by an American tourist than by a Parisian shopkeeper, since it is more unusual (and probably thus more important) to the tourist.

Content information that is recalled from storage by the user sometime after its capture may be granted an extended lifetime before degradation, since it was apparently of some importance to the user after its original capture. The more often the user consults such data after storage, the longer may be its extended lifetime. One approach restarts the retention period for a content excerpt (e.g., an image, or a 10 second audio clip) whenever such excerpt is recalled/consulted. Content that is temporally or geographically-proximate—such as preceding and following audio clips—may have its lifetime extended by a lesser amount. Another approach adds to the current retention period a further period, that may be based on when—in the retention period—the stored data was consulted. For example, the further period may be based on the time elapsed since the data was originally captured. If the stored data is consulted a week after its capture, its lifetime may be extended two weeks; if the stored data is consulted a month after its capture, its lifetime may be extended two months. Some arrangements can include a rule imposing a cap on the total amount of time the original retention period can be extended—either in absolute time (e.g., months) or in percentage.

The data retention can also depend, in part, on social network considerations. For example, if a social network acquaintance is granted access to a user's stored content data, and exercises that privilege to recall such data, this act may cause the content's lifetime to be extended (albeit generally not by as much time as if the user had recalled the content). Similarly, if both the user and a social network acquaintance visit a particular location (whether separately, or particularly if together), and both capture content data, then the acquaintance's later recall of the acquaintance's stored content data may cause the lifetime of the user's content data relating to that same location to be extended. If a social network acquaintance adjusts default rules governing retention of content captured in certain contexts (e.g., content captured on a ski day—as evidenced by altitude above a threshold value of 7000', and peak heart rate above a 99% personal norm—should be retained two years instead of just one), then the user's policy regarding content captured in similar context may also be adjusted (e.g., extending retention from a year to 14 months).

The influence of social network factors on data retention can depend on the degree of social connection. A user's content retention rules should be more influenced by social network connection to a spouse than to a plumber. The degree of social connectedness can be established by various metrics, including the number of third party acquaintances the two people have in common, the frequency with which they make network contact (e.g., interacting with the other's Facebook data), etc. The adjustment to a user's data retention policies may be determined by an equation that includes—as a factor—a metric such as the foregoing.

(Social network-based influences may be disabled, or limited to specific social network acquaintances, through use of a software tool that allows review and adjustment of a user's data retention policies.)

Just as certain factors may merit extending the data retention period, other factors may cause the retention period to be reduced. (Both may be regarded as extensions—the latter in a negative amount.)

Arrangements incorporating the foregoing techniques are believed to be different than those known in the art. For example, previous graceful degradation systems typically concern stored alphanumeric information rather than media-related content (e.g., transforming "Mulholland Drive" to "Los Angeles" after passage of a fixed period of time). Such graceful degradation systems generally concern user information in the custody of others (e.g., surveillance systems and service providers—such as doctors, phone companies, credit card providers, etc.)—not in the custody of the person to whom it relates. Other systems discard data entirely after a set period of time (e.g., as Microsoft's Bing search service does with a user's search history), rather than retain a distillation of same.

Other Comments

While this specification earlier noted its relation to the assignee's previous patent filings, it bears repeating. These disclosures should be read in concert and construed as a whole. Applicants intend that features in each disclosure be combined with features in the others. Thus, it should be understood that the methods, elements and concepts disclosed in the present application be combined with the methods, elements and concepts detailed in those related applications. While some have been particularly detailed in the present specification, many have not—due to the large number of permutations and combinations. However, implementation of all such combinations is straightforward to the artisan from the provided teachings.

Having described and illustrated the principles of our inventive work with reference to illustrative features and examples, it will be recognized that the technology is not so limited.

For example, while reference has been made to mobile devices such as smart phones, it will be recognized that this technology finds utility with all manner of devices—both portable and fixed. PDAs, organizers, portable music players, desktop computers, laptop computers, tablet computers, netbooks, ultraportables, wearable computers, servers, etc., can all make use of the principles detailed herein. Particularly contemplated smart phones include the Apple iPhone, and smart phones following Google's Android specification (e.g., the G2 phone (aka HTC Magic), manufactured for T-Mobile by HTC Corp., the Motorola Droid Pro phone, and the Google Nexus phone). The term "smart phone" (or "cell phone") should be construed to encompass all such devices, even those that are not strictly-speaking cellular, nor telephones. It also includes communication devices that may simply comprise a wireless headset—coupled to another device either carried by the user, or located at a distance (e.g., a cloud resource).

(Certain details of the iPhone, including its touch interface, are provided in Apple's published patent application 20080174570.)

Similarly, this technology also can be implemented using face-worn apparatus, such as augmented reality (AR) glasses. Such glasses include display technology by which computer information can be viewed by the user—either overlaid on the scene in front of the user, or blocking that scene. Virtual reality goggles are an example of such apparatus. Exemplary technology is detailed in patent documents U.S. Pat. No. 7,397,607 and 20050195128. Commercial offerings include the Vuzix iWear VR920, the Naturalpoint Trackir 5, and the ezVision X4 Video Glasses by ezGear. An upcoming alternative is AR contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometer, camera(s), projector(s), GPS, etc.

The design of smart phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer (e.g., an STMicroelectronics LIS331DLH), a 3-axis gyroscope (e.g., STMicroelectronics L3G4200D), a 3-axis compass (e.g., AKM Semiconductor AKM8975), one or more microphones, a vibration motor, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices. References to "processors" or "modules" should be understood to refer to functionality, rather than requiring a particular form of implementation.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts. Known artificial intelligence systems and techniques can be employed to make the inferences, conclusions, and other determinations noted above.

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

In addition to storing the software, the various memory components referenced above can be used as data stores for the various information utilized by the present technology (e.g., context information, reference data, parameters, etc.).

This technology can be implemented in various different environments. One is Android, an open source operating system available from Google, which runs on a Linux kernel. Android applications are commonly written in Java, and run in their own virtual machines.

Instead of structuring applications as large, monolithic blocks of code, Android applications are typically implemented as collections of "activities" and "services," which can be selectively loaded as needed. In certain implementations of the present technology, only the most basic activities/services are loaded. Then, as needed, others are started. These can send messages to each other, e.g., waking one another up. So if one activity looks for ellipses, it can activate a face detector activity if a promising ellipse is located.

Android activities and services (and also Android's broadcast receivers) are activated by "intent objects" that convey messages (e.g., requesting a service, such as generating a particular type of keyvector). By this construct, code can lie dormant until certain conditions arise. A face detector may need an ellipse to start. It lies idle until an ellipse is found, at which time it starts into action.

For sharing information between activities and services, Android makes use of "content providers." These serve to store and retrieve data, and make it accessible to all applications.

Android SDKs, and associated documentation, are available at developer<dot>android<dot>com/index.html.

Different of the functionality described in this specification can be implemented on different devices. For example, in a system in which a smart phone communicates with a server at a remote service provider, different tasks can be performed exclusively by one device or the other, or execution can be distributed between the devices. Extraction of eigenvalue data from imagery is but one example of such a task. Thus, it should be understood that description of an operation as being performed by a particular device (e.g., a smart phone) is not limiting but exemplary; performance of the operation by another device (e.g., a remote server, or the cloud), or shared between devices, is also expressly contemplated. (Moreover, more than two devices may commonly be employed. E.g., a service provider may refer some tasks, such as image search, object segmentation, and/or image classification, to servers dedicated to such tasks.)

In like fashion, description of data being stored on a particular device is also exemplary; data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in a task—such as contributing data from a local geography; see in this regard U.S. Pat. No. 7,254,406 to Beros.)

Similarly, while certain functions have been detailed as being performed by certain modules, agents, processes, etc., in other implementations such functions can be performed by other of such entities, or otherwise (or dispensed with altogether).

In many embodiments, the functions performed by various components, as well as their inputs and outputs, are specified or published (e.g., by the components) in the form of standardized metadata, so that same can be identified, such as by the dispatch process. The XML-based WSDL standard can be used in some embodiments. (See, e.g., Web Services Description Language (WSDL) Version 2.0 Part 1: Core Language, W3C, June, 2007.) An extension of WSDL, termed WSDL-S, extends WSDL to include semantic elements that improve reusability by, among other features, facilitating the composition of services. (An alternative semantic-capable standard is the Ontology Web Language for Services: OWL-S.) For communicating with cloud-based service providers, the XML-based Simple Object Access Protocol (SOAP) can be utilized—commonly as a foundation layer of a web services protocol stack. (Other service-based technologies, such as Jini, Common Object Request Broker Architecture (CORBA), Representational State Transfer (REST) and Microsoft's Windows Communication Foundation (WCF) are also suitable.)

Orchestration of web services can be accomplished using the Web Service Business Process Execution Language 2.0 (WS-BPEL 2.0). Choreography can employ W3C's Web Service Choreography Description Language (WS-CDL). JBoss's jBPM product is an open source platform adapted for use with both WM-BPEL 2.0 and WS-CDL. Active Endpoints offers an open source solution for WS-BPEL 2.0 under the name ActiveBPEL; pi4SOA on SourceForge is an open-source implementation of WS-CDL. Security for web services can be provided through use of the WS-Security (WSS) communications protocol, a popular Java library implementation of which is Apache's WSS4J.

Certain implementations of the present technology make use of existing libraries of image processing functions (software). These include CMVision (from Carnegie Mellon University—particularly good at color image segmentation), ImageJ (a freely distributable package of Java routines developed by the National Institutes of Health; see, e.g., en<dot>Wikipedia<dot>org/wiki/ImageJ), and OpenCV (a package developed by Intel; see, e.g., en<dot>Wikipedia<dot>org/wiki/OpenCV, and the book Bradski, Learning OpenCV, O'Reilly, 2008). Well regarded commercial vision library packages include Vision Pro, by Cognex, and the Matrox Imaging Library.

The refresh rate at which repeated operations are undertaken depends on circumstances, including the computing context (battery capacity, other processing demands, etc.). For example, some image processing operations may be undertaken for every captured frame, or nearly so (e.g., checking whether a lens cap or other obstruction blocks the camera's view). Others may be undertaken every third frame, tenth frame, thirtieth frame, hundredth frame, etc. Or these operations may be triggered by time, e.g., every tenth second, half second, full second, three seconds, etc. Or they may be triggered by change in the captured scene, etc. Different operations may have different refresh rates—with simple operations repeated frequently, and complex operations less so.

As noted earlier, image data (or data based on image data), may be referred to the cloud for analysis. In some arrangements this is done in lieu of local device processing (or after certain local device processing has been done). Sometimes, however, such data can be passed to the cloud and processed both there and in the local device simultaneously. The cost of cloud processing is usually small, so the primary cost may be one of bandwidth. If bandwidth is available, there may be little reason not to send data to the cloud, even if it is also processed locally. In some cases the local device may return results faster; in others the cloud may win the race. By using both, simultaneously, the user can always be provided the quicker of the two responses. (If local processing bogs down or becomes unpromising, it may be curtailed. Meanwhile, the cloud process may continue to churn—perhaps yielding results that the local device never provides.) Additionally, a cloud service provider such as Google may glean other benefits from access to the cloud-based data processing opportunity, e.g., learning details of a geographical environment about which its data stores are relatively impoverished (subject, of course, to appropriate privacy safeguards).

Sometimes local image processing may be suspended, and resumed later. One such instance is if a telephone call is made, or received; the device may prefer to apply its resources exclusively to serving the phone call. The phone may also have a UI control by which the user can expressly direct the phone to pause image processing. In some such cases, relevant data is transferred to the cloud, which continues the processing, and returns the results to the phone.

If local image processing does not yield prompt, satisfactory results, and the subject of the imagery continues to be of interest to the user (or if the user does not indicate otherwise), the imagery may be referred to the cloud for more exhaustive, and lengthy, analysis. A bookmark or the like may be stored on the smart phone, allowing the user to check back and learn the results of such further analysis. Or the user can be alerted if such further analysis reaches an actionable conclusion.

It will be understood that decision-making involved in operation of the detailed technology can be implemented in a number of different ways. One is by scoring. Parameters associated with relevant inputs for different alternatives are provided, and are combined, weighted and summed in different combinations, e.g., in accordance with a polynomial equation. The alternative with the maximum (or minimum) score is chosen, and action is taken based on that alternative. In other arrangements, rules-based engines can be employed. Such arrangements are implemented by reference to stored data expressing conditional rules, e.g., IF (condition(s)), THEN action(s), etc. Adaptive models can also be employed, in which rules evolve, e.g., based on historical patterns of usage. Heuristic approaches can also be employed. The artisan will recognize that still other decision processes may be suited to particular circumstances.

Artisans implementing systems according to the present specification are presumed to be familiar with the various technologies involved.

While this disclosure has detailed particular ordering of acts and particular combinations of elements in the illustrative embodiments, it will be recognized that other methods may re-order acts (possibly omitting some and adding others), and other combinations may omit some elements and add others, etc.

Although disclosed as complete systems, sub-combinations of the detailed arrangements are also separately contemplated.

Reference was made to the internet in certain embodiments. In other embodiments, other networks—including private networks of computers—can be employed also, or instead.

Artificial intelligence techniques can play an important role in embodiments of the present technology. A recent entrant into the field is the Alpha product by Wolfram Research. Alpha computes answers and visualizations responsive to structured input, by reference to a knowledge base of curated data. Information gleaned from arrangements detailed herein can be presented to the Wolfram Alpha product to provide responsive information back to the user. In some embodiments, the user is involved in this submission of information, such as by structuring a query from terms and other primitives gleaned by the system, by selecting from among a menu of different queries composed by the system, etc. In other arrangements, this is handled by the system. Additionally, or alternatively, responsive information from the Alpha system can be provided as input to other systems, such as Google, to identify further responsive information. The Alpha technology is now available as an iPhone app.

Another adjunct technology is Google Voice, which offers a number of improvements to traditional telephone systems. Such features can be used in conjunction with the present technology.

For example, the voice to text transcription services offered by Google Voice can be employed to capture ambient audio from the speaker's environment using the microphone in the user's smart phone, and generate corresponding digital data (e.g., ASCII information).

In another aspect, when a user captures content (audio or visual) with a smart phone device, and a system employing the presently disclosed technology returns a response, the response information can be converted from text to speech, and delivered to the user, e.g., to the user's voicemail account in Google Voice. The user can access this data repository from any phone, or from any computer. The stored voice mail can be reviewed in its audible form, or the user can elect instead to review a textual counterpart, e.g., presented on a smart phone or computer screen.

Cell phones commonly use touchscreen interfaces—a form of gesture interface. Another form of gesture interface that can be used in embodiments of the present technology operates by sensing movement of a smart phone—by tracking movement of features within captured imagery. Further information on such gestural interfaces is detailed in Digimarc's U.S. Pat. No. 6,947,571. Gestural techniques can be employed whenever user input is to be provided to the system.

Looking further ahead, user interfaces responsive to facial expressions (e.g., blinking, etc) and/or biometric signals detected from the user (e.g., brain waves, or EEGs) can also be employed. Such arrangements are increasingly well known; some are detailed in patent documents 20010056225, 20020077534, 20070185697, 20080218472 and 20090214060. Other technologies, including bionic and haptic/electronic/mechanical/magnetic/olfactory/optic devices, can be substituted for the detailed input/output arrangements.

Reference was made to GPS as a location-determining technology. Other location technologies can also be employed. One type utilizes radio signals of the sort that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in published patent applications 2009213828, 2009233621, 2009313370, 2010045531, and 2010202300. A smart phone can cooperate with other nodes in such a network to thereby learn the phone's location.

Technology for encoding/decoding watermarks is detailed, e.g., in Digimarc's U.S. Pat. Nos. 6,614,914 and 6,122,403; in Nielsen's U.S. Pat. Nos. 6,968,564 and 7,006, 555; and in Arbitron's U.S. Pat. Nos. 5,450,490, 5,764,763, 6,862,355, and 6,845,360.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. No. 6,990,453 and U.S. Pat. No. 7,359,889 (Shazam). Examples of image/video fingerprinting are detailed in patent publications U.S. Pat. No. 7,020, 304 (Digimarc), U.S. Pat. No. 7,486,827 (Seiko-Epson), 20070253594 (Vobile), 20080317278 (Thomson), and 20020044659 (NEC).

Nokia acquired a Bay Area startup founded by Philipp Schloter that dealt in visual search technology (Pixto), and has continued work in that area in its "Point & Find" program. This work is detailed, e.g., in published patent applications 20070106721, 20080071749, 20080071750, 20080071770, 20080071988, 20080267504, 20080267521, 20080268876, 20080270378, 20090083237, 20090083275, and 20090094289. Features and teachings detailed in these documents are suitable for combination with the technologies and arrangements detailed in the present application, and vice versa.

As will be recognized, the present specification has detailed many novel arrangements. Due to practical constraints, many such arrangements are not claimed in the original filing of this application, yet applicants intend to claim such other subject matter in subsequent applications claiming priority. An incomplete sampling of some of the inventive arrangements is reviewed in the following paragraphs:

A device including a memory, a processor, and at least one sensor that produces an output signal responsive to physical taps from a user, in which the memory contains software instructions enabling the user to define and store a custom grammar by which different sequences of user taps initiate different device operations (e.g., recitation of time or weather). (The sequence may include taps at different locations relative to the device, taps of different intensities, and taps of different cadences.)

A device including a sensor module and a processor module, these modules cooperating to (a) sense repeated taps by a single finger at a single location on the device, and output a first signal indicating same; and (b) sense taps by plural fingers at different locations on the device, and output a second, different, signal indicating same.

An arrangement employing a portable user device having at least one microphone that captures audio, and at least one image sensor for capturing imagery. Audio data corresponding to user speech captured by the microphone is sent to a speech recognition module, which returns corresponding recognized user speech data. By reference to this recognized user speech data, an image portion of interest to the user within imagery captured by the image sensor is determined.

An arrangement employing a portable user device having at least one microphone that captures audio, and at least one image sensor for capturing imagery. First audio data corresponding to user speech captured by the microphone is sent to a speech recognition module, which returns corresponding first response data. The system—uncertain of what action to take—invites the user to provide a further spoken clue. Second audio data corresponding to captured user speech is then sent to a speech recognition module—this time returning second response data. By reference to the received data, the system determines an image portion of interest to the user, within imagery captured by the image sensor.

An arrangement employing a portable user device having at least one microphone that captures audio, and at least one image sensor for capturing imagery. Audio data corresponding to user speech captured by the microphone is sent to a speech recognition module, which returns corresponding recognized user speech data. This speech data includes one or more words related to a subject depicted in imagery captured by the image sensor (e.g., color, shape, name, etc.). Based at least in part on such word(s), one or more operations to be applied in connection with the captured imagery are selected, from a larger set of possible operations.

A system including a memory, a processor, and at least one output component (e.g., a screen, a speaker, etc.) The memory contains software instructions configuring the system to perform the following operations including: recall a default wake-up alarm time; consult a data repository to identify a circumstance that may merit adjusting the default wake-up time; set a wake-up alarm for an adjusted wake-up time that is different than the recalled default wake-up alarm time; and issue the wake-up alarm at the adjusted wake-up time, using the output component.

A system includes a memory, a processor, and at least one output component. The memory contains software instructions configuring the system to perform the operations including: (a) recall historical data corresponding to one or more previous commutes to a destination; (b) check data corresponding to a current commute (e.g., transit agency data about timing of a mass transit service, or the user's current location versus a current time, or weather data, or user heart rate or pedal cadence, etc.); (c) determine, from the checked data, that the current commute will probably result in an arrival time to the destination later than a previous commute; and (d) take an action (e.g., provide information about an alternate commute), based on the foregoing.

A system includes a memory, a processor, and at least one vibration component. The memory contains software instructions configuring the system to perform the operations including: (a) sense a user's direction of movement; (b) direct that a vibration component issue a first vibratory signal to the user to signal that the user should take a right turn; and (c) direct that a vibration component issue a second vibratory signal to the user to signal that the user should take a left turn.

An arrangement that includes storing content (e.g., audio/imagery) captured at a first location by a portable user device, and, after passage of a first set interval of time, automatically degrading the audio and/or imagery content in accordance with one or more stored privacy rules relating to retention of captured content. ("Automatically" means without contemporaneous express user direction. For example, the user may have earlier instructed, or agreed, that certain privacy rules would be applied to captured content, but the degrading act does not require further user intervention.) The degrading may cause features of the content to be lost (e.g., changing resolution), or the content may be deleted entirely. However, before the content is degraded, certain aspects may be first distilled for a further period of storage. This distillation can include, e.g., (a) recognizing, from audio content, speech of a known person (e.g., a proprietor of the user device, or the proprietor's social network acquaintances), and producing associated speech transcription data; (b) recognizing a face of a known person from captured imagery, and producing associated name information; (c) extracting barcode data from image content; (d) decoding watermark data from image or audio content; and/or (e) computing a fingerprint function from image or audio content. A track of associated geolocation data may also be maintained. Parameters for such policies are stored in a rules data store. The policies may involve different periods of retention depending on the location where the content was captured, the unusualness of the data, user action in later consulting/using the stored data, and/or a social network influence.

Figure 2:
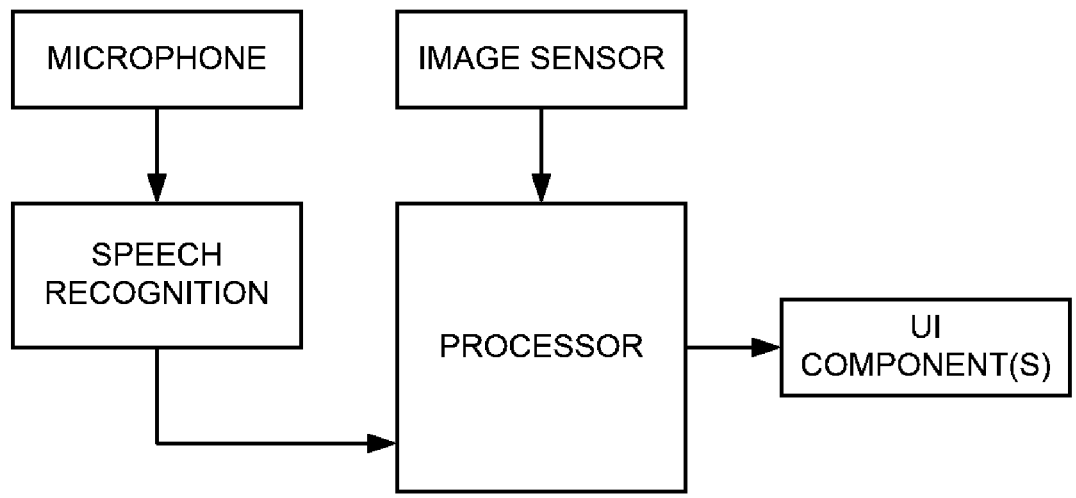
Figure 3:
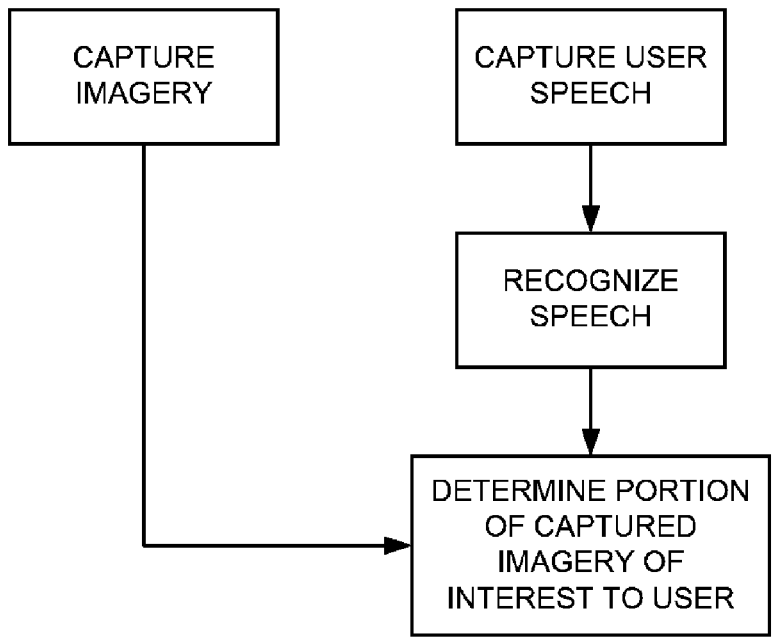
Figure 4:
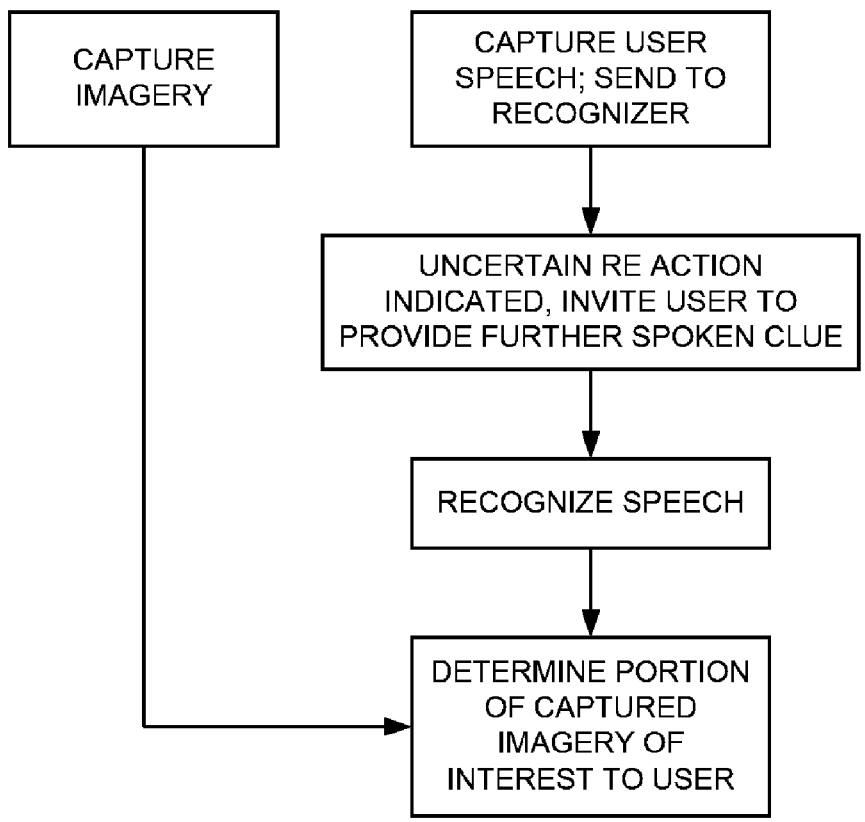
Figure 5:
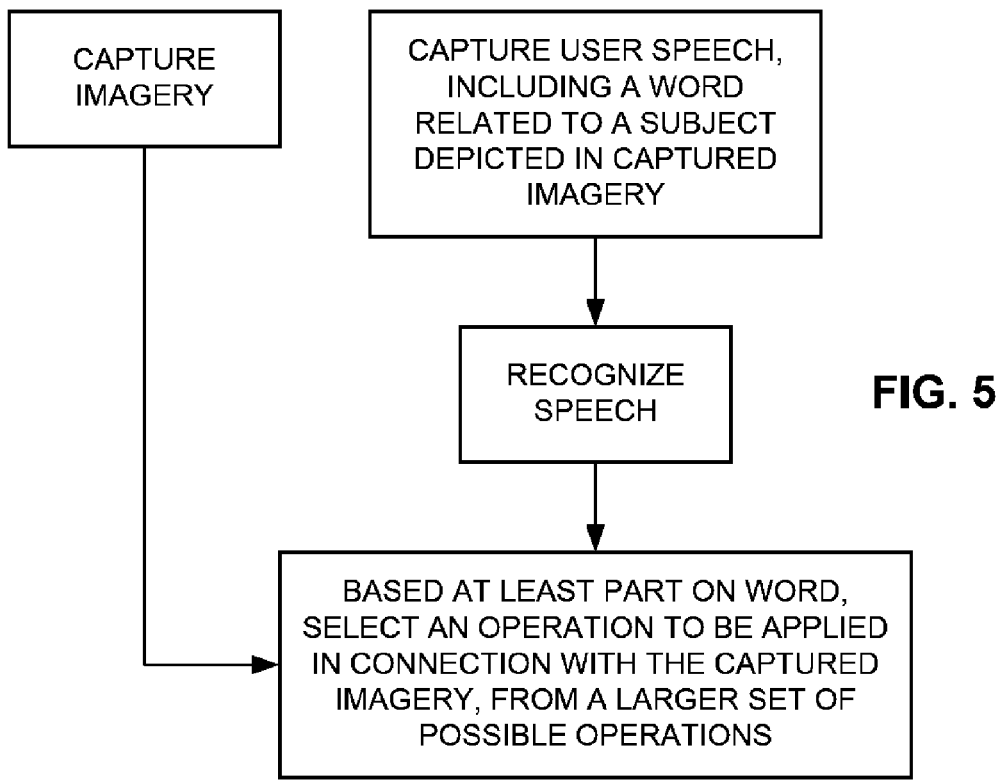
Figure 6:
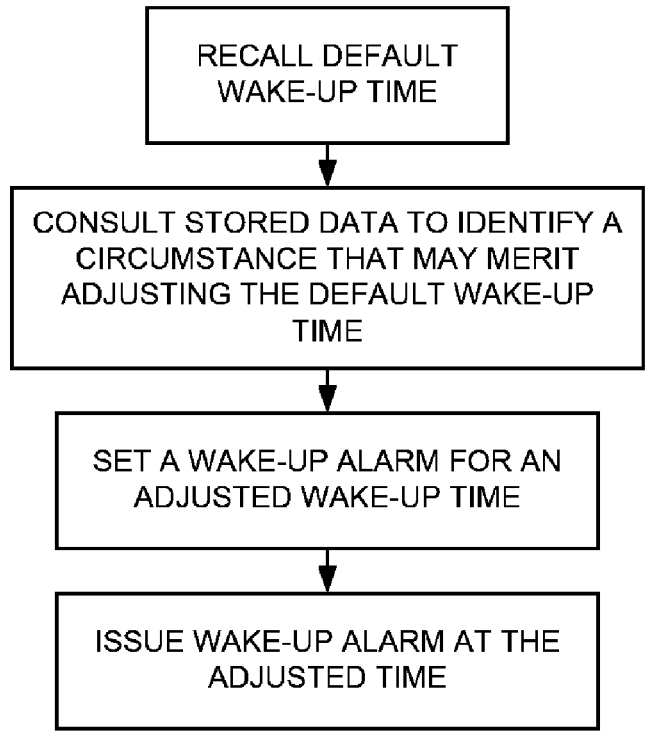
Figure 7:
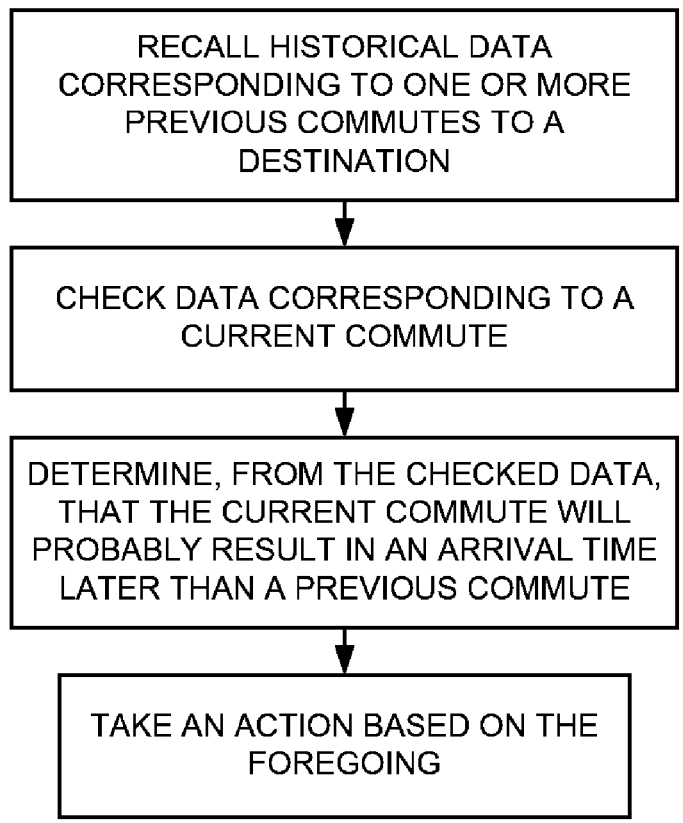
Figure 8:
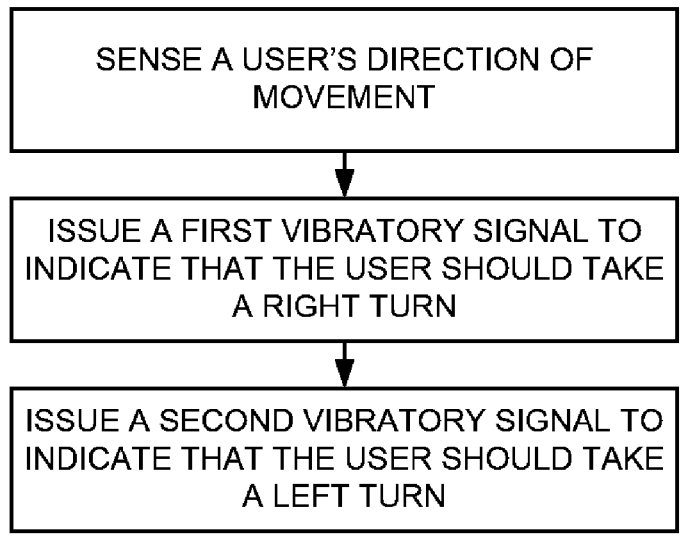
Figure 9:
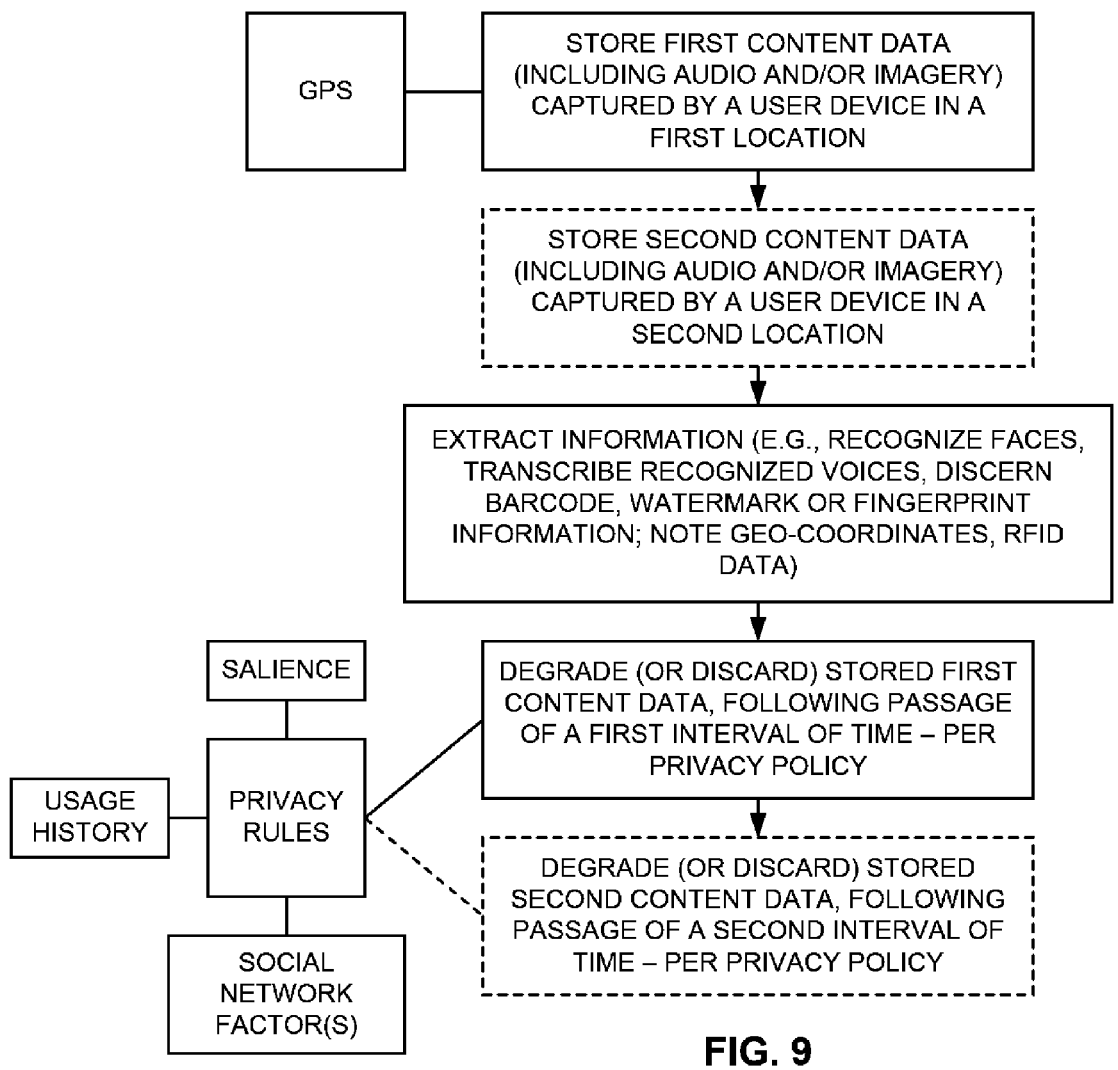

Illustrations depicting certain aspects of the foregoing arrangements are presented in FIGS. 1-9.

Methods, systems, and computer readable media based on the foregoing are also disclosed.

In the interest of conciseness, the myriad variations and combinations of the described technology are not cataloged in this document. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicants incorporate by reference the above-cited documents and patent disclosures. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A method employing a portable user system having a processor, a display, at least one microphone that captures audio, and at least one image sensor for capturing imagery, the method comprising the acts:

capturing imagery with the image sensor of the portable user system, the captured imagery depicting plural physical subjects within a physical environment of a user, and presenting the captured imagery to the user on the display;

the processor selecting a first of said depicted plural physical subjects as being of likely interest to the user, in accordance with stored rule data, and indicating said processor selection of the first depicted subject by a marking presented on the display;

capturing user speech with the microphone;

sending, to a speech recognition module, audio data corresponding to the user speech, and receiving recognized user speech data corresponding thereto;

the processor employing information from the recognized user speech data as a verbal clue to help identify a second physical subject depicted within the captured imagery, different than the processor-selected first depicted subject, that is of actual interest to said user;

the processor causing said marking to move from the depiction of the first subject to the depiction of the second subject;

after receiving the recognized user speech data, performing an image processing operation concerning the second depicted subject; and presenting on said display, as a graphical overlay on the captured imagery, a graphical indicia output, different than said marking, that depends on a result of said image processing operation.

2. The method of claim 1 in which said verbal clue is a color.

3. The method of claim 1 in which said verbal clue is a person's name.

4. The method of claim 1 in which said verbal clue is a business' name.

5. The method of claim 1 in which said verbal clue comprises the word "left," "right," "up," or "down".

6. The method of claim 1 in which said recognized user speech data includes the word "square".

7. A system comprising several elements including a processor, a memory, a camera, a display, and a microphone, at least certain of said elements being included in a face-worn apparatus, wherein the memory contains software instructions causing the system to perform the method of claim 1.

8. A non-transitory computer readable medium containing software instructions operative to cause a user's portable computer system, equipped with a processor, a display, at least one microphone, and at least one image sensor, to perform acts including:

receiving camera imagery from the image sensor, depicting plural physical subjects within a physical environment of the user, and presenting the imagery to the user on the display;

selecting a first of said depicted plural physical subjects as being of likely interest to the user, in accordance with stored rule data, and indicating said selection of the first depicted subject by a marking presented on the display;

capturing user speech with the microphone;

sending, to a speech recognition module, audio data corresponding to the user speech, and receiving recognized user speech data corresponding thereto;

employing information from the recognized user speech data as a verbal clue to help identify a second physical subject depicted within the imagery, different than the first depicted subject, that is of actual interest to said user;

causing said marking to move from the depiction of the first subject to the depiction of the second subject;

after receiving the recognized user speech data, performing an image processing operation concerning the second depicted subject; and presenting on said display, as a graphical overlay on the imagery, a graphical indicia output, different than said marking, that depends on a result of said image processing operation.

9. A method employing a portable user device having a display, at least one microphone that captures audio, and at least one image sensor for capturing imagery, the method comprising the acts:

(a) capturing imagery with the image sensor, the captured imagery depicting plural physical subjects within an environment of said user, and capturing user speech with the microphone;

(b) sending, to a speech recognition module, audio data corresponding to the user speech, and receiving recognized user speech data corresponding thereto;

(c) performing a verbally-clued computer-implemented cognition process, said cognition process employing information from the recognized user speech data as a verbal clue to help identify a physical subject within the captured imagery that is of interest to said user;

(d) displaying the captured imagery to the user on said display; and (e) presenting on said display, as a graphical overlay on the captured imagery, a graphical indicia that is determined based on said verbally-clued cognition process;

wherein the presented graphical indicia varies based on said identified physical subject; and wherein a set of stored rules establishes a priority order by which the cognition process ranks the plural subjects depicted in the captured imagery as being of probable interest to the user, wherein the recognized user speech data causes the cognition process to progress from one subject in said priority order, to a next subject in said priority order.

10. The method of claim 9 that further includes moving a bounding box from around said first subject, to said next subject, when the cognition process progresses from said first subject to said next subject.

11. The method of claim 9 in which said recognized user speech data includes the word "not".

12. A method employing a portable user device having a display, at least one microphone that captures audio, and at least one image sensor for capturing imagery, the method comprising the acts:

(a) capturing imagery with the image sensor, the captured imagery depicting plural physical subjects within an environment of said user, and capturing user speech with the microphone;

(b) sending, to a speech recognition module, audio data corresponding to the user speech, and receiving recognized user speech data corresponding thereto;

(c) performing a verbally-clued computer-implemented cognition process, said cognition process employing information from the recognized user speech data as a verbal clue to help identify a physical subject within the captured imagery that is of interest to said user;

(d) displaying the captured imagery to the user on said display; and (e) presenting on said display, as a graphical overlay on the captured imagery, a graphical indicia that is determined based on said verbally-clued cognition process;

wherein the presented graphical indicia varies based on said identified physical subject; and wherein:

the device indicates a first subject of possible interest to the user, by presenting an indicia on the screen indicating said first subject;

in response to first recognized user speech data, the device indicates a second subject of possible interest to the user, by changing said indicia to indicate said second subject instead of said first subject; and in response to second recognized user speech data, the device indicates a third subject of possible interest to the user, by changing said indicia to indicate said third subject instead of said second subject;

wherein the method emulates conversation, with the user directing, the device responding, and the user further-directing.

\* \* \* \* \*